May 11, 1937. H. MAHLE 2,080,286

PISTON

Filed April 8, 1935

INVENTOR:
Hermann Mahle
BY
Ramsey + Kent
his ATTORNEYS.

Patented May 11, 1937

2,080,286

UNITED STATES PATENT OFFICE 2,080,286

PISTON

Hermann Mahle, Stuttgart, Germany, assignor to Bohn Aluminum & Brass Corporation, Detroit, Mich., a corporation of Michigan Application April 8, 1935, Serial No. 15,314
In Germany April 7, 1934

4 Claims. (Cl. 309—14)

(Granted under the provision of sec. 14, act of Mar. 2, 1927, 357 O. G. 5)

This invention relates to a piston formed of light-weight material.

Such pistons, particularly when formed of magnesium or its alloys, are not as resistant to wear as are pistons made of cast iron, but they have other advantages, such as lightness and superior heat conduction, that make their use imperative in modern high speed internal combustion engines.

The chief object of the present invention is to provide a practical construction in which the main parts of the piston are formed of a light-weight material, such as a magnesium alloy, and the thrust faces, which are the piston parts receiving the greatest wear, are protected by wear elements formed of harder material, such as iron or steel. These wear elements, since they carry the main side thrust loads of the piston, should be supported directly from the piston pin bosses, so as to avoid transmitting the stresses resulting from the side thrust of the connecting rod through other parts of the piston. The arrangement of the parts must be such that no harmful distortion of the piston is caused thereby.

It has been proposed heretofore to control the excessive expansion of light-weight pistons by means of chordal struts formed of steel, and in one form of the present invention these chordal struts are extended so as to form the wear-elements that protect the thrust faces.

These and other objects and advantages of the invention will become apparent as the description proceeds.

While preferred forms of the invention are disclosed herein for purposes of illustration, it should be understood that various changes may be made in the structure without departing from the spirit of the invention as herein described and claimed.

Figure 1:
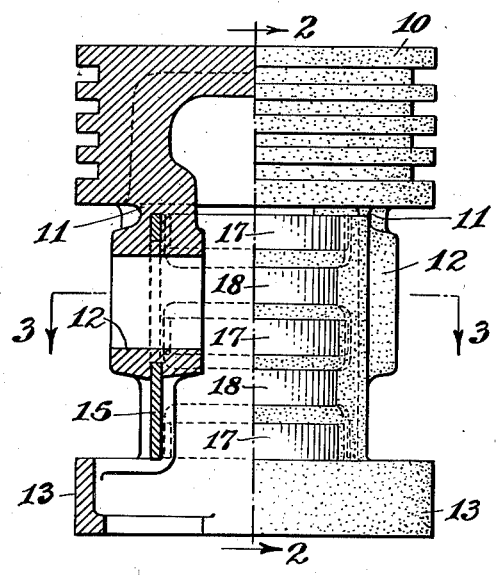
Fig. 1 is a side elevation partly in section of a piston embodying the invention.
Figure 2:
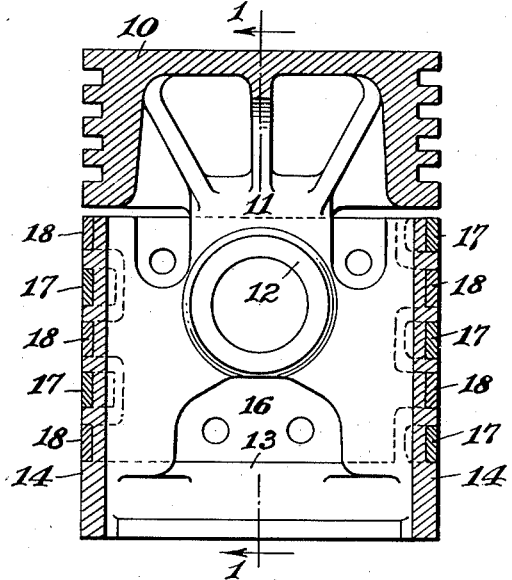
Fig. 2 is a section on line 2—2 of Fig. 1.
Figure 3:
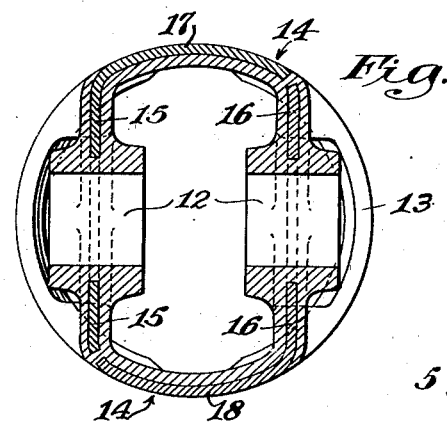
Fig. 3 is a section on line 3—3 of Fig. 1.

Referring to the drawing more particularly, the piston shown in Figs. 1 to 3 comprises a head 10, piers 11 depending from the head and carrying piston pin bosses 12. The skirt includes a lower annular part 13 and thrust faces 14, the skirt, pin bosses and head all being formed of a light-weight piston material such as magnesium alloy.

A pair of control struts 15 and 16 are formed of some material, such as steel, having a lower coefficient of thermal expansion than the material of the skirt, and each strut passes through a pin boss and has its ends connected to the opposite thrust faces 14.

In order to provide wear members extending over and protecting the thrust faces, each end of each strut carries a plurality of fingers. Strut 15 carries along each of its vertical edges a plurality of spaced fingers 17, and strut 16 carries similar fingers 18. These fingers extend in spaced, interfitting arrangement across the surface of each thrust face, the spaces between adjacent fingers being filled by the skirt material, as plainly shown in Fig. 2.

In this arrangement the struts 15 and 16 control the expansion of the skirt and their extension fingers that lie flush with the thrust faces act as wear members, thereby prolonging the life of the piston as far as surface wear is concerned.

In manufacturing this piston the light-weight metal is preferably cast around the struts in such a manner that the fingers 17 and 18 are completely buried, and only come to the surface when the excess metal is removed in the finishing operations.

Figure 4:
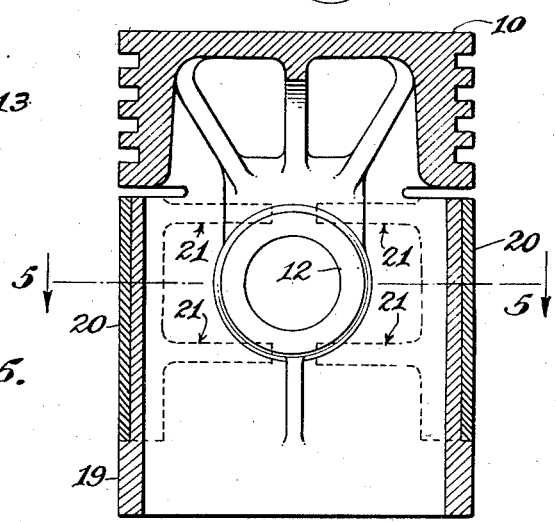
Figs. 4 and 5 are views corresponding to Figs. 2 and 3 but showing a modified form of the invention.
Figure 5:
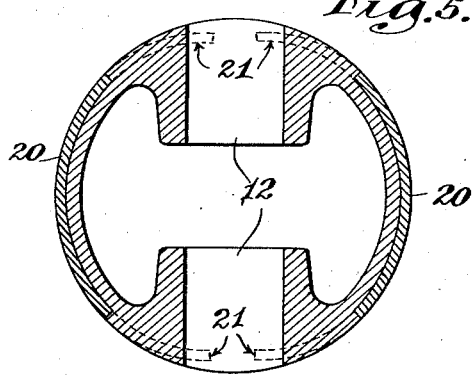

Figs. 4 and 5 illustrate another form of the invention, in which the skirt is a complete cylinder 19, and the wear members 20 are partly-cylindrical and carry lugs 21 that have their ends embedded in the piston pin bosses.

It should be noted that in each form of the invention the wear members have parts engaging in the piston pin bosses so that the wear member constitutes a direct thrust member between the wrist pin and a thrust face of the piston.

I claim:

1. A piston comprising a head, piston pin bosses connected to the head, a pair of oppositely disposed thrust faces, the head, bosses and thrust faces being formed of light-weight material, a pair of struts of material harder than, and having a lower coefficient of thermal expansion than, that of the thrust faces, extending chordally across the axis of the piston pin bosses, each strut carrying at each end respectively a plurality of fingers that extend horizontally across a thrust face, the fingers forming part of the surface of the thrust face.

2. A piston comprising a head, piston pin bosses connected to the head, a skirt connected to the bosses and having a lower annular part, the head, bosses and skirt being formed of light-weight piston material, parts of the skirt lying on arcs from one pin boss to the other constituting thrust faces, a pair of struts of material harder than, and having a lower coefficient of thermal expansion than, that of the thrust faces, extending chordally across the axis of the piston pin bosses, each strut being partly embedded in a piston pin boss and extending from one thrust face to the other, each strut having along each of its vertical edges a plurality of curved fingers, the fingers of one strut interfitting with the fingers of the other strut to form part of the surfaces of the thrust faces.

3. A piston as described in claim 2 in which the strut fingers are spaced from each other, the spaces between the fingers being filled with material of the thrust faces.

4. A piston as described in claim 2 in which the strut fingers are spaced from each other, the spaces between the fingers being filled with material of the thrust faces, the outer surfaces of the fingers being flush with the outer surface of the thrust faces.

HERMANN MAHLE.